United States Patent
Mikkenie et al.

(10) Patent No.: US 6,797,661 B2
(45) Date of Patent: Sep. 28, 2004

(54) DIELECTRIC COMPOSITION, METHOD OF MANUFACTURING A CERAMIC MULTILAYER ELEMENT, AND ELECTRONIC DEVICE

(75) Inventors: Ronald Mikkenie, Maastricht (NL); Gerardus Christiaan Marie Dortant, Roermond (NL); Knuth Albertsen, Goch (DE); Heinz Georg Kohler, Aachen (DE); Tilman Schlenker, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/923,605

(22) Filed: Aug. 7, 2001

(65) Prior Publication Data

US 2002/0093782 A1 Jul. 18, 2002

(30) Foreign Application Priority Data

Aug. 8, 2000 (EP) .......................................... 00202793

(51) Int. Cl.$^7$ .......................................... C04B 35/468
(52) U.S. Cl. .................................................... 501/139
(58) Field of Search ...................... 501/139; 361/321.4, 361/321.5

(56) References Cited

U.S. PATENT DOCUMENTS

| 5,556,818 A | 9/1996 | Kohler et al. | ................ 501/138 |
|---|---|---|---|
| 6,107,228 A | * 8/2000 | Sugimoto et al. | ............ 501/139 |
| 6,108,192 A | * 8/2000 | Sugimoto et al. | ......... 361/321.1 |
| 6,184,165 B1 | * 2/2001 | Kawata et al. | ............... 501/139 |
| 6,458,734 B1 | * 10/2002 | Sugimoto et al. | ............ 501/139 |

FOREIGN PATENT DOCUMENTS

| EP | 0926107 A2 | 6/1999 |
|---|---|---|
| EP | 0960868 A1 | 12/1999 |

* cited by examiner

*Primary Examiner*—Karl Group
(74) *Attorney, Agent, or Firm*—Aaron Waxler

(57) ABSTRACT

The dielectric composition contains a mixture of a ceramic composition containing $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, and free from lead and bismuth, a glass composition, and a metal oxide. The glass composition preferably contains ZnO or MgO, $SiO_2$, and at least 10% by weight of $Li_2O$ or $TiO_2$. Preferably, the alkaline earth metal oxide is MgO. By preference, the glass composition essentially consists of 50–80% weight of $SiO_2$, 5–25% weight of MgO, and optionally another alkaline earth metal oxide, and 10–25% by weight of $Li_2O$, and is substantially free from boron. The dielectric composition can be sintered in the presence of Cu electrodes at a temperature below the melting point of Cu so as to manufacture an electronic device such as a ceramic multilayer element. After sintering, the dielectric composition has a relative dielectric constant of at least 55.

4 Claims, 1 Drawing Sheet

US 6,797,661 B2

DIELECTRIC COMPOSITION, METHOD OF MANUFACTURING A CERAMIC MULTILAYER ELEMENT, AND ELECTRONIC DEVICE

FIELD OF THE INVENTION

The invention relates to a dielectric composition comprising a mixture of a ceramic composition containing $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, and free from lead and bismuth, and a glass composition comprising $SiO_2$.

The invention also relates to a method of manufacturing a ceramic multilayer element comprising the steps of manufacturing a multilayer stack comprising a first ceramic foil, a first electrode comprising Cu, a second ceramic foil, and a second electrode comprising Cu, which ceramic foils are manufactured from a dielectric composition comprising a ceramic composition and a glass composition comprising $SiO_2$, which ceramic composition contains $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, the ceramic composition being free from lead and bismuth; and sintering the multilayer stack.

The invention further relates to an electronic device comprising a first dielectric ceramic layer, a first electrode comprising Cu, and a second electrode.

BACKGROUND OF THE INVENTION

Such a dielectric composition is known from EP-A-0926107. The ceramic composition $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, is generally known as a group of materials with a high dielectric constant. If no glass composition is added, however, the ceramic composition has a high sintering temperature, generally of more than 1300° C. It is known that the addition of a glass composition leads to a decrease in the sintering temperature. The known dielectric composition has a sintering temperature of about 1000° C., which is below 1084° C., the melting temperature of copper. Since glasses themselves have a low dielectric constant, the composite dielectric composition comprising the ceramic composition and the glass composition has a relatively low dielectric constant as well; the relative dielectric constant is less than 50. In order to get a higher dielectric constant, lead or bismuth are generally present in the ceramic composition. The dielectric composition can be sintered at a low temperature. The presence of lead or bismuth, however, makes the dielectric composition toxic and harmful to the environment when incinerated or otherwise disposed of as waste.

The known dielectric composition further contains CuO. The presence of CuO gives the known dielectric composition a higher dielectric constant. The presence of CuO also results in a lower sintering temperature. This CuO is added as a powder or as an ingredient of the glass composition. If a Pb-containing ceramic composition is used, the relative dielectric constant is 62 without the presence of CuO and 77 with the presence of CuO, cf. the compositions nos. 2, 3, and 6 listed in the cited application.

Compositions, with nos. 21, 22, and 34 are known from the cited application which are free of lead and bismuth and which can be sintered at a temperature lower than 1100° C. The glass composition in such a dielectric composition comprises 23% by weight of $SiO_2$, 14% by weight of $B_2O_3$, 61% by weight of alkaline earth metal oxides, and 2% by weight of $Li_2O$. The alkaline earth metal oxide comprises 82% by weight of BaO and at least one compound selected from the group consisting of SrO, CaO and MgO. The dielectric compositions referred to further contain CuO. The dielectric compositions have a firing temperature of 1000° C. and relative dielectric constants of between 27 and 60.

Next to a high dielectric constant, it is necessary for electronic applications in the high frequency domain that the temperature coefficient of the dielectric constant should be small. A criterion for this is the NP0-standard, which states that the temperature coefficient of the dielectric constant— also known as the temperature coefficient of capacitance or TCC—should be in the range of −30 to +30 ppm/° C. The cited dielectric compositions fulfilling this criterion and free of lead and bismuth have relative dielectric constants between 48 and 53.

According to this NP0-standard, furthermore, the dielectric composition should have an RC-time of at least 1000 seconds after sintering. This RC-time has been defined as the product of the resistance against insulation and the capacitance, and is a measure for the stability of the dielectric composition.

A disadvantage of said known dielectric compositions, which are free of lead and bismuth and of which the TCC fulfills the NP0-standard, is that the relative dielectric constant is relatively low. Dielectric compositions with high dielectric constants are required for the miniaturization of devices for high-frequency applications.

SUMMARY OF THE INVENTION

It is therefore a first object of the invention to provide a dielectric composition of the kind described in the opening paragraph which has a relative dielectric constant higher than 55, of which the TCC fulfills the NP0-standard, and which can be sintered with electrodes containing Cu.

It is a second object to provide a method of manufacturing a ceramic multilayer element of the kind described in the opening paragraph which has a high capacitance relative to its surface area, the temperature coefficient of said capacitance being low.

It is a third object of the invention to provide an electronic device as described in the opening paragraph which is suitable for high-frequency applications.

DETAILED DESCRIPTION OF THE PREFERRED EMBODIMENTS

Figure 1:
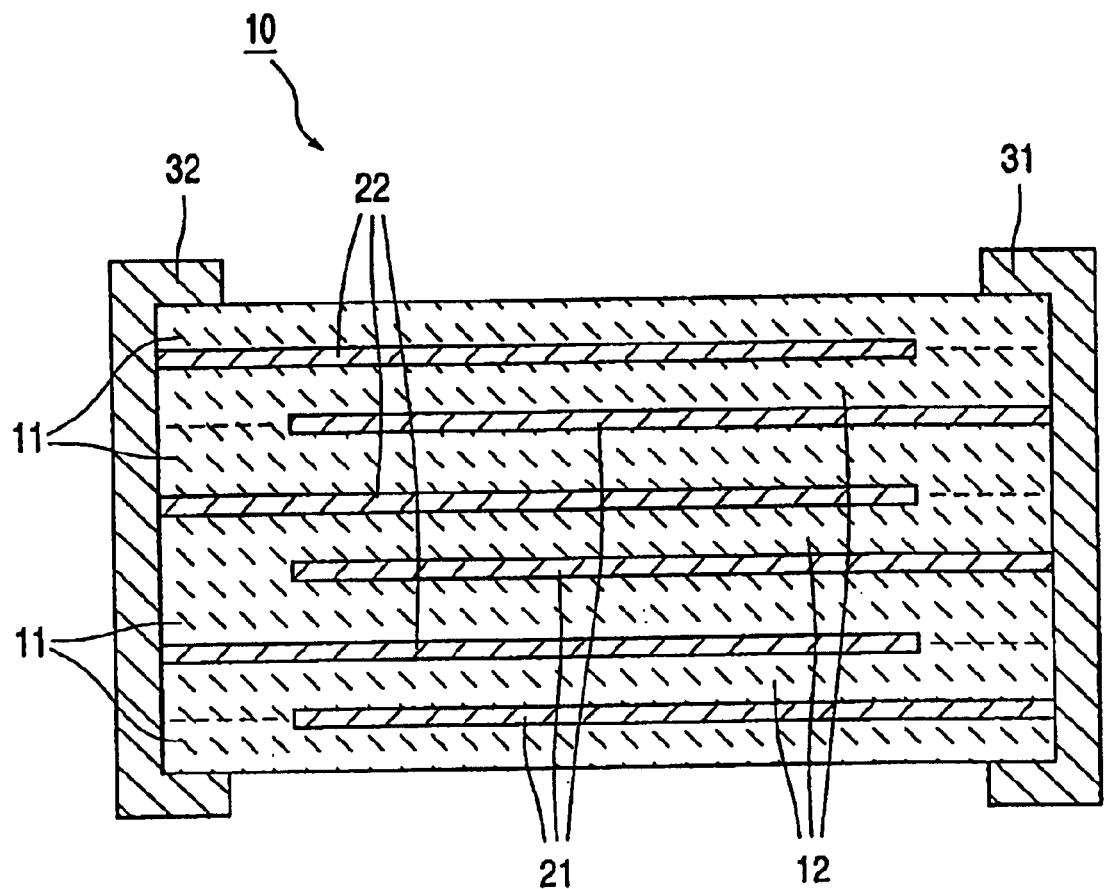
FIG. 1 is a diagrammatic cross section of one embodiment according to the present invention.

The first object is achieved in that the dielectric composition contains:

the ceramic composition, as the glass composition, a composition comprising $SiO_2$, a bivalent metal oxide chosen from the group consisting of MgO and ZnO, and at least 10% weight with respect to the glass composition of a further metal oxide chosen from the group consisting of $Li_2O$ and $TiO_2$, and a metal oxide which is different from the bivalent metal oxide present in the glass composition.

It was surprisingly found that the dielectric composition of the invention achieves the first object of the invention: a dielectric composition having a relative dielectric constant which is higher than 55, meeting the terms of the NP0-standard, and capable of being sintered together with electrodes containing Cu.

The metal oxide in the dielectric composition of the invention has as its primary function to improve the RC-time. Said RC-time can be calculated as the product of the insulation resistance and the capacitance, both of which parameters can be measured. It was founded that without the presence of a metal oxide the insulation resistance is low after sintering. With such a low insulation resistance of about $10^3$ MΩ, an RC-time below the NP0-standard is obtained. It was further found, that without the presence of a metal oxide the dielectric composition is reduced to a semiconducting material during sintering.

An advantage of the metal oxide is that its presence reduces the TCC of the sintered dielectric composition to values within the limits of the NP0-standard, as is apparent from the data in Table 3. Both effects of the metal oxide—improvement of RC-time and stabilization of TCC—could not be predicted from the presence of CuO in the dielectric compositions of the cited application. According to the cited application, CuO has as its primary function to increase the dielectric constant. It was found, furthermore, that not only CuO, but also a wide variety of other metal oxides can be used for improving the RC-time and stabilizing the TCC of the dielectric composition.

Preferably, the metal oxide present in the dielectric composition is an oxide of a metal chosen from the group consisting of magnesium, manganese, iron, cobalt, nickel, copper, zinc, yttrium, indium, tungsten, dysprosium, holmium, erbium, ytterbium and lutetium. Table 3 shows the effect on the dielectric constant, the RC-time, and the TCC of the presence of a wide variety of metal oxides. All of the preferred metal oxides, except for tungsten oxide, are oxides of so-called "acceptor" metals. The metal ions of these acceptor metals have a charge which is smaller than that of titanium and have a radius which is at most as great as that of titanium. According to the inventors, these metal ions can-and partly do-replace titanium ions in the ceramic composition, in which the barium rare-earth titanate is generally present in a lattice. In this replacement, oxygen vacancies are also created in the barium rare-earth titanate lattice. Especially in combination with copper electrodes, which bring the condition of a low partial oxygen pressure, this creation of oxygen vacancies appears to be essential for preventing reduction of the dielectric composition to a semiconducting ceramic material during sintering. However, the inventors do not want to be fastened down on said explanation. For example, the explanation does not cover, how tungsten oxide acts in preventing the reduction of the dielectric composition during sintering.

Several glass compositions have been found to be effective in lowering the sintering temperature. A variety of silicate glass compositions can be chosen as the glass composition, such as those primarily based on $Li_2O$—$MgO$—$SiO_2$, $Li_2O$—$ZnO$—$SiO_2$, $ZnO$—$SiO_2$—$TiO_2$, $MgO$—$SiO_2$—$TiO_2$, $Li_2O$—$MgO$—$ZnO$—$SiO_2$—$TiO_2$. All of these glass composition contain the further metal oxide $TiO_2$ or $Li_2O$ in an amount of at least 10% by weight.

In an embodiment of the dielectric composition of the invention the further metal oxide in the glass composition is $Li_2O$. It follows from the data in Tables 1 and 2 that dielectric composition with the glass compositions G2, G4, G5, which contain 21, 18 and 14% by weight of $Li_2O$, respectively, can be sintered at a lower temperature than the dielectric composition with the glass compositions G1, G3, which contain 2 and 3% weight of $Li_2O$, respectively. However, those skilled in the art would never use a glass composition containing more than 10% weight of $Li_2O$. It is stated in the cited application that with such a glass composition the dielectric composition has an unsatisfactory moisture resistance after sintering. This unsatisfactory moisture resistance has not been observed by the inventors.

In an embodiment, the glass composition essentially consists of 50–80% by weight of $SiO_2$, 5–25% by weight of at least one alkaline earth metal oxide, and 10–25% by weight of $Li_2O$, and is substantially free from boron. Good results were obtained with said glass composition. The glass composition has as a further advantage that it can be used in combination with the binder polyvinyl alcohol, which is water-soluble. In comparison with binders which are soluble in organic solvents, the water-soluble binder is substantially less harmful to the environment.

Preferably, the glass composition is present in an amount of 3 to 5% by weight with respect to the ceramic composition. It has been found that the addition of 3 to 5% by weight of the glass composition of the invention provides a lowering in the sintering temperature of a barium rare-earth titanate ceramic composition of at least 130° C., i.e. from above 1200° C. to 1070° C. or below. This effective lowering of the sintering temperature is huge in comparison with the cited application, in which at least 10% by weight of a glass composition must be added to obtain a sufficient sintering at temperatures of about 1000° C. As a consequence of the small amount of the glass composition present in the dielectric composition, the relative amount of the ceramic composition present in the dielectric composition is large.

In a further embodiment, the alkaline earth metal oxide is primarily MgO. It was surprisingly found that, with a glass composition containing MgO and substantially free from CaO, BaO, and SrO, the sintering temperature is reduced from 1060 to 1040° C. when using the same amount of glass. As is also apperent from Table 3, the reduction of the sintering temperature takes place whith the use of a smaller amount of the glass composition. This results in a higher dielectric constant.

In another embodiment of the dielectric composition of the invention, the bivalent metal oxide is ZnO, and the further metal oxide is $TiO_2$. The glass composition ZnO—$SiO_2$—$TiO_2$ is known from EP-A-0960868, which is incorporated herein by reference. This document contains no indication that this glass composition can be sintered below the melting point of Cu if a metal oxide different from the bivalent metal oxideforming part of the glass composition is present.

Preferably, a $Ba_aRE_bTi_cO_3$ is chosen as the ceramic composition in which Nd and Gd are present as RE and in which furthermore the Ba is partially substituted by Sr. Such compositions are known from U.S. Pat. No. 5,556,818, which is incorporated herein by reference.

The second object of the invention is achieved in that
  the glass composition contains a bivalent metal oxide chosen from the group consisting of MgO and ZnO and at least 10% by weight with respect to the glass composition of a further metal oxide chosen from the group consisting of $Li_2O$ and $TiO_2$,
  the dielectric composition further contains a metal oxide which is different from the bivalent metal oxide present in the glass composition, and
  the multilayer stack is sintered at a temperature of between 900 and 1080° C. and in an atmosphere which is non-oxidizing for Cu.

In the method of the invention, the dielectric composition of the invention is sintered together with copper electrodes. Examples of atmospheres which are non-oxidizing for copper are $N_2/H_2O$, $CO_2/CO$ and pure $N_2$. Examples of glass compositions are given in Table 1. Other glass compositions may also be used, such as those primarily based on $Li_2O$—$MgO$—$SiO_2$, $Li_2O$—$ZnO$—$SiO_2$, $ZnO$—$SiO_2$—$TiO_2$, $MgO$—$SiO_2$—$TiO_2$, $Li_2O$—$MgO$—$ZnO$—$SiO_2$—$TiO_2$.

Preferably, the sintering takes place at a temperature of between 1000 and 1050° C. Preferably, the multilayer stack contains a large number of first and second electrodes, which first and second electrodes are connected to a first and a second terminal, respectively. The ceramic multilayer element may be, for example, be a ceramic multilayer capacitor, an array of ceramic multilayer capacitors, or a high-frequency filter.

The third object of the invention is achieved in that the first dielectric ceramic layer is a sintered body comprising:

a ceramic composition containing $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, and being free from lead and bismuth, a glass composition comprising $SiO_2$, a bivalent metal oxide chosen from the group consisting of MgO and ZnO and at least 10% weight with respect to the glass composition of a further metal oxide chosen from the group consisting of $Li_2O$ and $TiO_2$, and a metal oxide, which is different from the bivalent metal oxide present in the glass composition.

The electronic device of the invention achieves the object in that it has a relative dielectric constant of at least 55, in that it has a TCC in the range of −30 to +30 ppm/° C., and in that it contains no lead or bismuth. Since copper has a high electrical conductivity, electrical losses in the electrodes are strongly reduced. Furthermore, the cost price of the device of the invention is reduced in comparison with a device in which the electrodes consist of noble metal. Copper may also be present in the form of interconnects, terminals, etcetera, as is known in the field of manufacturing electronic devices. A variety of silicate glass compositions may be chosen for the glass composition, such as those listed in Table 1 and those mentioned above. The metal oxide is preferably chosen from the group consisting of magnesium, manganese, iron, cobalt, nickel, copper, zinc, yttrium, indium, tungsten, dysprosium, holmium, erbium, ytterbium and lutetium. A $Ba_aRE_bTi_cO_3$ is preferably chosen as the ceramic composition, in which Nd and Gd are present as RE, and in which furthermore the Ba is partially substituted by Sr.

The electronic device may be or may comprise a high-frequency filter such as a filter for electromagnetic interference, an LC an RC, an LRC filter, a common mode filter, or a differential mode filter. Alternatively, the electronic device may be a passive component such as a ceramic multilayer capacitor or an array of capacitors. In a further embodiment, the first ceramic layer, or a stack of ceramic layers with electrodes sandwiched in between the ceramic layer, is used as a substrate onto which further components are provided by deposition and patterning of layers, or by assembling of discrete components. The electronic device then offers an integrated solution for a high-frequency application, such as a mobile phone.

TABLE 1 glass compositions in % by weight

|  | BaO | SrO | MgO | ZnO | $Li_2O$ | $TiO_2$ | $SiO_2$ |
|---|---|---|---|---|---|---|---|
| G1 | 26 | 18 | 7 | 0 | 2 | 0 | 47 |
| G2 | 11 | 7 | 3 | 0 | 21 | 0 | 58 |
| G3 | 0 | 0 | 30 | 0 | 3 | 0 | 67 |
| G4 | 0 | 0 | 15 | 0 | 18 | 0 | 67 |
| G5 | 0 | 0 | 9 | 0 | 14 | 0 | 77 |
| G6 | 0 | 0 | 0 | 36 | 0 | 35 | 29 |
| G7 | 0 | 0 | 0 | 28 | 0 | 28 | 44 |

TABLE 2

Sinteringtemperature $T_s$ and relative dielectric constant K of the dielectric composition comprising a glass and a ceramic composition of $BaGdNdSrTiO_3$, wherein the glass % is the percentage by weight of glass with respect to the ceramic composition

| No | glass | glass % | $T_s$ (° C.) | $K(\epsilon_o)$ |
|---|---|---|---|---|
| 1* | G1 | 2 | 1160 | 75 |
| 2* | G1 | 5 | 1130 | 70 |
| 3* | G1 | 10 | 1100 | 60 |
| 4* | G1 | 20 | 1050 | 47 |
| 5 | G2 | 5 | 1060 | 55 |
| 6* | G3 | 5 | 1100 | 55 |
| 7* | G4 | 1 | 1150 | 65 |
| 8 | G4 | 5 | 1040 | 55 |
| 9 | G4 | 3 | 1040 | 62 |
| 10 | G5 | 4 | 1040 | 55 |
| 11** | G6 | 2 | 1050 | 70 |

*outside the scope of the present invention
**further containing 0.5% by weight of CuO

TABLE 3

Sinteringtemperature $T_s$, RC-time, relative dielectric constant K and temperature coefficient of capacitance TCC of a dielectric composition comprising 4% of the glass G4, a ceramic composition of $BaGdNdSrTiO_3$, and an additive, wherein the additive % is the percentage by weight of the additive with respect to the ceramic composition. Sintering took place in an atmosphere which is non-oxidizing for copper ($H_2O/N_2$), except for example 2, where the partial oxygen pressure was higher.

| No. | Additive | additive % | $T_s$ (° C.) | $K(\epsilon_o)$ | RC-time ($10^3$ s) | TCC (ppm/° C.) |
|---|---|---|---|---|---|---|
| 1* | — |  | 0 | 1040 | 130 | 0.0001 | very large |
| 2* | — |  | 0 | 1040 | 60 | 0.07 | −45 |
| 3 | CuO | 0.5 | 1052 | 66 | 1.3 | −18 |
| 4 | CuO | 1.0 | 1052 | 65 | 2.1 | −16 |
| 5 | CuO | 2.0 | 1045 | 69 | 3.1 | −14 |
| 6 | $MnO_2$ | 0.5 | 1030 | 66 | 8.3 | −19 |
| 7 | $MnO_2$ | 0.5 | 990 | 62 | 5.0 | −19 |
| 8 | $Co_3O_4$ | 0.5 | 1050 | 68 | 4.5 | −7 |
| 9 | ZnO | 0.5 | 1041 | 66 | 4.0 | −12 |
| 10 | $Y_2O_3$ | 0.5 | 1030 | 68 | 5.5 | −26 |
| 11 | $Y_2O_3$ | 1.0 | 1041 | 64 | 3.0 | −30 |
| 12 | $Dy_2O_3$ | 0.5 | 1048 | 70 | 5.1 | −2 |
| 13 | $Ho_2O_3$ | 0.5 | 1048 | 70 | 1.7 | −4 |
| 14 | $Er_2O_3$ | 0.5 | 1047 | 71 | 3.2 | −8 |
| 15 | $In_2O_3$ | 0.5 | 1050 | 68 | 5.8 | −10 |
| 16 | $WO_3$ | 0.5 | 1048 | 72 | 6.4 | −28 |

*= outside the scope of the present invention

These and other aspects of the dielectric composition, the glass composition, the method of manufacturing and the electronic device will be explained in more detail below with reference to FIG. 1, which is a diagrammatic cross-section of a first electronic device, a ceramic multilayer element.

EXAMPLE 1

The ceramic multilayer element 10 of FIG. 1 comprises a first ceramic layer 11, a first electrode 21 of Cu which is in electrical contact with a first terminal 31, a second ceramic layer 12, and a second electrode 22 of Cu which is in contact with a second terminal 32. A number of each of said layers 11, 12 and said electrodes 21, 22 are present in the ceramic multilayer element 10, which results in a multilayer stack. The ceramic multilayer element 10 is a capacitor.

In order to manufacture the ceramic multilayer element 10, a dielectric composition was prepared by mixing 50 g of $Ba_{0.231}Gd_{0.196}Nd_{0.270}Sr_{0.020}Ca_{0.050}Ti_{1.00}O_3$, 2 g of a glass composition containing $Mg_{0.18}Li_{0.60}Si_{0.52}O_{1.00}$, 0.25 g of $Y_2O_3$, 50 g of water, and a suitable dispersing agent. After milling in a ball mill with yttrium-stabilized zirconia balls for 20 hours, an organic binder containing polyvinyl alcohol was added to the dielectric composition. The mixture was subjected to wet mixing so as to prepare a ceramic slip. This ceramic slip was subjected to sheet molding by the doctor blade method to obtain a rectangular green sheet having a thickness of 21 μm. Next, a conductive paste comprising Cu was printed on the ceramic green sheet 11, 12 to form an electrode 21,22. A plurality of the above-mentioned ceramic green sheets 11, 12 on which the electrodes 21,22 were formed were laminated such that one electrode 21,22 was present each time between two ceramic green sheets 11, 12.

The resulting structure was dried and subsequently pressed under a pressure of 10 a. The resulting structure was sintered in a kiln, which was heated slowly from room temperature to 1030° C. and subsequently cooled down slowly to room temperature. The total firing time was about 9 h. A gas flow of $N_2/H_2O$ was maintained during firing.

After the first and the second terminals had been provided in the standard way, the ceramic multilayer capacitor was ready. The K-value was 68, the loss factor tan δ was $2.10^{-4}$. The capacitance was 33 pF. The temperature coefficient of capacitance was −26 ppm/° C. The insulation resistance was $7.10^6$ MΩ, giving a RC-time of 5500 s.

What is claimed is:

1. A dielectric composition comprising a mixture of:
   a ceramic composition containing $Ba_aRE_bTi_cO_3$, wherein RE represents a rare earth element, with $0.05 \leq a \leq 0.25$, $0.525 \leq b \leq 0.70$, $0.85 \leq c \leq 1.0$, and $2a+3b+4c=6$, and free from lead and bismuth,
   a glass composition comprising $SiO_2$, a bivalent metal oxide chosen from the group consisting of MgO and ZnO and greater than 10% to about 25% by weight with respect to the glass composition of a further metal oxide consisting of $Li_2O$, said glass composition substantially free from boron, and
   a metal oxide which is different from the bivalent metal oxide present in the glass composition.

2. A dielectric composition as claimed in claim 1, wherein the metal oxide in the dielectric composition is an oxide of a metal chosen from the group consisting of magnesium, zinc, copper, manganese, cobalt, iron, nickel, erbium, holmium, indium, dysprosium, tungsten and yttrium.

3. A dielectric composition as claimed in claim 1, wherein the glass composition essentially consists of 50–80% by weight of $SiO_2$, and 5–25% by weight of MgO.

4. A dielectric composition as claimed in claim 1, wherein the glass composition is present in an amount of 3 to less than about 5% by weight with respect to the ceramic composition.

* * * * *